United States Patent [19]

Kersten et al.

[11] Patent Number: 4,756,734
[45] Date of Patent: Jul. 12, 1988

[54] METHODS OF MAKING PLANAR LIGHTWAVE GUIDES

[75] Inventors: Ralf T. Kersten, Bremthal; Wolfgang Siefert, Mainz, both of Fed. Rep. of Germany

[73] Assignee: Schott Glaswerke, Mainz, Fed. Rep. of Germany

[21] Appl. No.: 919,402

[22] Filed: Oct. 16, 1986

[30] Foreign Application Priority Data

Oct. 16, 1985 [DE] Fed. Rep. of Germany ....... 3536781
Sep. 6, 1986 [DE] Fed. Rep. of Germany ....... 3630479

[51] Int. Cl.$^4$ .......................... C03P 8/04; C03C 21/00
[52] U.S. Cl. ........................................ 65/31; 65/18.2; 65/30.1; 65/60.2; 350/96.12; 372/45
[58] Field of Search ............ 65/30.1, 30.13, 31, 65/3.12, 3.14, 60.2, 60.51, 18.2; 427/163, 166, 162; 430/321; 350/96.12, 320; 372/45, 46; 29/569 L

[56] References Cited

U.S. PATENT DOCUMENTS 4,400,052 8/1983 Alferless .................. 350/96.12
4,652,290 3/1987 Cho ...................... 350/96.12 X

FOREIGN PATENT DOCUMENTS 0017296 3/1980 European Pat. Off. .
0052901 6/1982 European Pat. Off. .
2912960 9/1980 Fed. Rep. of Germany .
2930781 12/1981 Fed. Rep. of Germany .
3232888 8/1984 Fed. Rep. of Germany .
60-188906 9/1985 Japan ...................... 350/96.12

OTHER PUBLICATIONS

Hass et al.; Physics of Thin Films, vol. 5, 1969; Academic Press, N.Y., p. 238.
Crow et al; Applied Optics, vol. 14, No. 3, 3-1975; pp. 580-585.

Primary Examiner—Kenneth M. Schor
Attorney, Agent, or Firm—Millen & White

[57] ABSTRACT

A method of making a planar lightwave-guide with light-conducting core zones by precipitation out of a gaseous phase a thin, glass-like strata onto a substrate in accordance with a controlled schedule so as to allow a predetermined refractive index curve to be obtained to thereby form a light-conducting core zone and sheathing layer adjacent to the core zone. The improvement is characterized in that the precipitation out of the gaseous phase is obtained by application of a heterogeneous reaction and in that initially a first layer with a doping medium which decreases the refractive index is applied to the substrate and thereafter a masking layer is applied on top of the first layer to act as a diffusion barrier with respect to the doping medium. The masking layer is structured by conventional masking technology in accordance with a desired strip or band pattern. Thereafter, the substrate provided with these layers is heated to a degree sufficient to diffuse the doping medium out of the unmasked regions of the first layer and thus forming at least a portion of the core zone of the light-conducting regions. Further layers are then applied in which the refractive indices are controlled to complete the lightwave-guide.

11 Claims, 3 Drawing Sheets

METHODS OF MAKING PLANAR LIGHTWAVE GUIDES

BACKGROUND OF THE INVENTION

This invention relates to methods of making planar lightwave guides with light conducting regions by the precipitation out of a gaseous phase of thin, glass-like strata on a substrate in accordance with a controlled schedule, thereby obtaining a predetermined refractive index curve, so as to result in the formation of a light-conducting core zone and sheathing zones adjacent to the core zone.

Planar lightwave guides are used in optical communication systems as coupling elements for optical wave conductors. Depending on the chosen arrangement, these coupling elements serve the purpose of signal branching and signal mixing, i.e. they serve as demultiplexer/multiplexer elements.

A known method for making these wave guides is the CVD process in which $SiCl_4$ of high purity is mixed with a few per cent of $TiCl_4$ and caused to react with oxygen in an open flame. The glass particles which are produced by flame hydrolysis are deposited on a substrate. During the deposition process, the burner is continuously reciprocated so that several layers are formed. The refractive index is controlled by the $TiCl_4$ current. Thereafter the substrate with the porous glass layers is heated in order that the individual layers will consolidate (Kawachi et al., Electronics Letters 1983, Vol. 19, No. 15, page 583).

The layer system is then covered with a silicon mask and guide grooves for the accommodation of wave conductors as well as light conducting strips, are produced by targeted etching (Yamada et al., Electronics Letters 1984, Vol. 20, No. 8, Page 313).

These known planar wave guides have the disadvantage that the refractive index profile through the deposited layers can be predetermined in only one direction, namely in the direction normal to the substrate. After etching, the light-conducting strip has a substantially rectangular cross-sectional configuration and the profile of the light-conducting core is not laterally adapted which gives rise to considerable losses due to dampening. Another drawback resides in that only relatively thick layers can be produced so that no finely graded refractive index profile can be obtained.

A method is known from European Patent Application EP-0052901 whereby coupling elements are made with light-conducting strips which are round in cross section. To this end, grooves having a semicircular cross sectional configuration are formed by etching or mechanically in the substrate glass plate in accordance with a predetermined pattern. In the next step, glass-like layers are precipitated out of the gaseous phase on to the glass plate and in these grooves by application of a CVD process. With increasing layer thickness, increasingly more doping material is deposited jointly with the quartz glass. This is continued until the grooves are completely filled by these layers. The same is applied to another substrate provided with the corresponding mirror-image groove pattern. Then both substrates plates are polished and joined so that the grooves with the glass-like layers coincide. Whilst these strip conductors have a circular cross section with a radially outwardly decreasing refractive index, their manufacture is not without problems.

The production process and particularly the polishing operation are very expensive. The grooves must coincide precisely and neither impurities nor air gaps may remain at the seam or junction between the substrate plates in the region of the light-conducting layers.

SUMMARY OF THE INVENTION

It is an object of the present invention to provide a method for making planar waveguides in which the afore-described disadvantages appertaining to the state-of-the-art are avoided. The method according to the invention is substantially simpler whilst at the same time the resulting planar wave guide is distinguished from the known planar wave guides by lower losses.

The aforementioned object is realized in accordance with one embodiment of the invention by a method which is characterized in that precipitation out of a material in a gaseous phase is applied by means of a heterogeneous reaction. A first layer with a doping medium which lowers the refractive index is applied to the substrate. Thereafter, a covering layer, by way of diffusion barrier for the said doping medium is applied to the first layer. The covering layer is structured by conventional masking technology in accordance with the desired strip pattern. Subsequently, the substrate provided with the layers is heated so that the doping medium diffuses out of the uncovered regions, thus forming the core zone, or a part of a core zone, of the light-conducting regions. Thereafter, further layers are applied in which the refractive indices are controlled so as to complete the lightwave guide.

The layer which is provided with the doping medium which lowers refractive index may also show a predetermined refractive index curve.

Due to diffusing out of the doping medium, for which fluorine is preferably used, a semicylindrical zone with a refractive index which increases toward the cylinder axis is produced in the unmasked regions of the first layer. Fluorine or any other doping medium may be used which has the effect of lowering the refractive index and may be diffused out. The semicylindrical core zone is then complemented by further layers, which may potentially also be doped by fluorine in such a way as to result in the formation of a low-dampening light-conducting zone.

Preferably a non-isothermic plasma CVD process is used for the precipitation of the glass-like layers.

In accordance with a second embodiment of the invention, a monomode light wave guide for transmitting polarized light is produced by forming two narrow ribs directly adjacent to the core zone which ribs are flanked by films of silicon dioxide. The structure is then covered by films of silicon dioxide doped with fluorine.

The process for precipitating out of material in the gaseous phase, which is already known from EP-0017296, incorporated herein by reference is herein understood to be a process which operates with a so-called "cold" plasma in which only electrons have a high kinetic energy. With such a plasma, even gas mixtures which are not thermally reactive can be caused to react. With this non-isothermic, PCVD process, it is possible at fairly low temperatures, to precipitate glass-like layers directly out of a gaseous phase so that subsequent heat application for vitrification may be dispensed with. A further advantage resides in that for a precipitation at low temperature, that is to say between room temperature and 300° C., any potentially existing difference in the thermal expansion coefficients of the glass plate material and the layers deposited thereon will not have a noticeable adverse effect.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DESCRIPTION OF THE PREFERRED EMBODIMENTS

Figure 1:
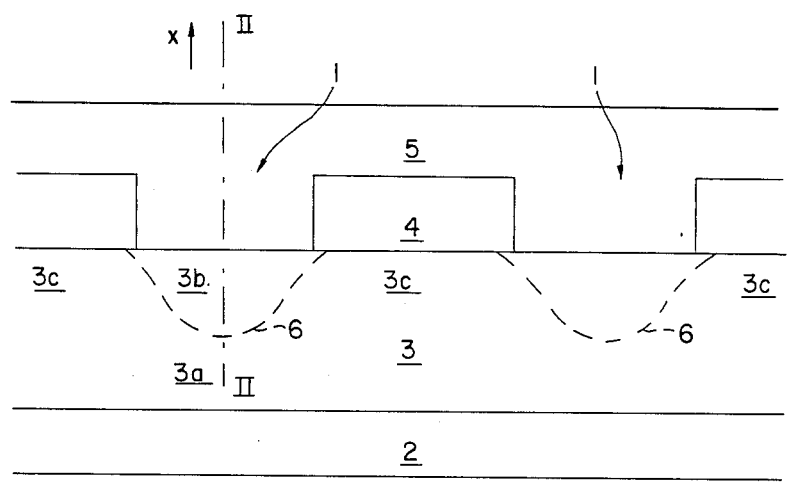
FIG. 1 is a section through a planar wave guide made in accordance with a first embodiment of a method in accordance with the present invention.
Figure 2:
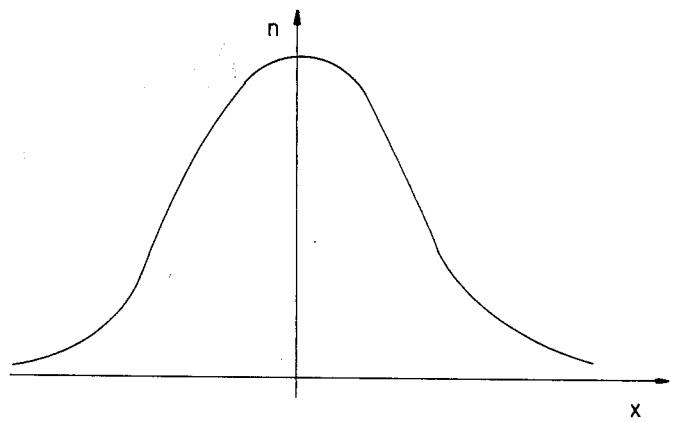
FIG. 2 illustrates the refractive index curve of the two layers 3 and 5 along line II—II in FIG. 1.

Referring now to the first embodiment of the invention illustrated by FIGS. 1 and 2, a planar waveguide according to the invention is shown in section with a substrate plate 2 and light-conducting regions 1. A first layer 3, which is provided with a doping medium, such as fluorine, is applied to the substrate 2 and subsequently selectively covered over by a masking layer 4. The masking layer 4 works as a diffusion barrier with respect to the doping medium contained in layer 3. The layer 3 has a thickness in the range of 10–60 $\mu$. The masking layer 4 has a thickness in the range of 3–10 $\mu$. By application of heat, the doping medium is subsequently caused to diffuse out of the unmasked regions 3a of layer 3 so that a core zone 3b indicated approximately by the dotted line 6, will be formed in which the refractive index increases continuously towards the axis of the core zone which is approximately semi-cylindrical in shape. The thickness of layer 3 is selected so as to ensure that between line 6 and substrate 2 there is preserved a sufficiently large area 3a of layer 3, complete with doping medium, in order to isolate wave energy from the substrate so that the substrate does not participate in light-conduction. Thereafter, a further layer 5 is applied, in which the refractive index curve is selected such as to complement the core zone 3b and form a sheathing zone.

The refractive index curve through layer 3 and 5 in the X-direction along line II—II in FIG. 1 is illustrated in FIG. 2.

For example, for making a monomodal fiber, a core zone of about 2–8 $\mu$m will be formed. The fluorine (or boron) contained in layer 3 will be allowed to diffuse out for about one to two minutes at a temperature in the range of 2000°–2200° C., whereafter the final layer 3 will be applied in a known manner.

The masking layer 4, doped for example with $B_2O_3$, acts as a diffusion barrier for the doping medium in the first layer 3 therebeneath. This ensures that it is only in the unmasked regions 3b of the first layer 3 that a refractive index gradient can form by diffusion out of the doping medium.

The refractive index profile and the dimensions of the core zone 3b are adjusted by the width of the unmasked regions 3b of the first layer 3 and the temperature and length of time of the diffusing out process in such a way that either a monomodal wave guide or a multimodal wave guide is produced.

The refractive indices of the remaining layers and the numerical aperture are also adapted to the given purpose of application of the device. This is accomplished by the differences between the fractive indices (numerical aperture), and by the geometry and dimensions of the core zone 5 which are about 5–10 $\mu$ for mono-mode wave guides.

Since during diffusing out of the refractive index lowering doping medium (which is preferably fluorine), the doping medium of the masking or covered layer 4 also diffuses out of proximate surface regions, increasing the possibility that a leaking wave conductor could be produced, which would give rise to greater losses. For this reason, a thin superficial layer of the unmasked regions of the layer 3b and the masking layer 4 is removed by etching, preferably after the diffusion process.

In order to ensure the complete isolation of wave energy relative to the substrate 2, the layer 3 which is provided with a doping medium is applied to the substrate with a layer thickness such that after the diffusing out of the said doping medium from the unmasked regions, a correspondingly large doped region 3c and 3a is preserved between the thus formed core zone 3b and the substrate 2. This has the advantage that the substrate does not participate in conduction of light so that the substrate 2 need not consist of a highly pure material, this saving costs in the production of the planar wave guides.

In operative glass fiber connections (not shown), guide grooves (not shown) are formed in front of the light-conducting strips 1 and in the substrate 2 in which the wave conductors or guides which are to be coupled are inserted.

With the planar light wave guides produced according to the invention absorption losses amount to significantly less than 0.2 dB/cm.

Figure 3:
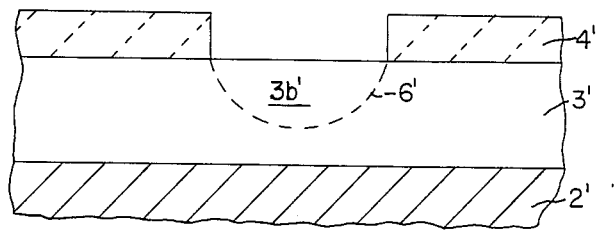
FIG. 3 is a cross section of a waveguide initially configured similarly to that of FIG. 1, but subsequent to evaporating fluorine from the core area.

Referring now to the second embodiment of the invention shown in FIGS. 3-6, wherein primed reference numerals are used to illustrate layers or regions analogous to the layer or regions in FIG. 1; it is seen in FIG. 3 that the core zone 3b' is formed by heating the waveguide to drive fluorine from the layer 3' to form a core zone having an arcuate boundary 6'. After the heating process, the masking area 4' which is comprised of $SiO_2$ doped with $B_2O_3$, of course remains.

Figure 4:
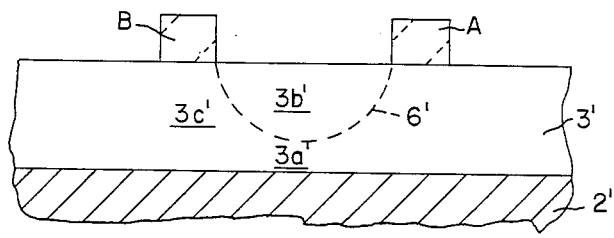
FIG. 4 is a view similar to FIG. 3, but subsequent to etching away portions of the masking area except for those portions adjacent to core area.

Referring now to FIG. 4, the masking area 4' has been etched away with $C_2F_4$, $CCl_2F_2$, $SF_6$ except for two rib areas A and B positioned directly adjacent the core zone 3b'. The cross-section illustrated in FIG. 4 is accomplished by first masking the areas A and B with layer of photo resist (not shown) and then etching the exposed portion of mask 4' with $C_2F_4$, $CCl_2F_2$ or $SF_6$.

Figure 5:
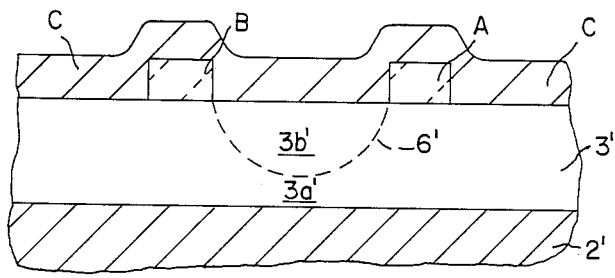
FIG. 5 is a view similar to FIGS. 3 and 4, but showing deposition of a thin film of silicon dioxide which replaces the masking film.
Figure 6:
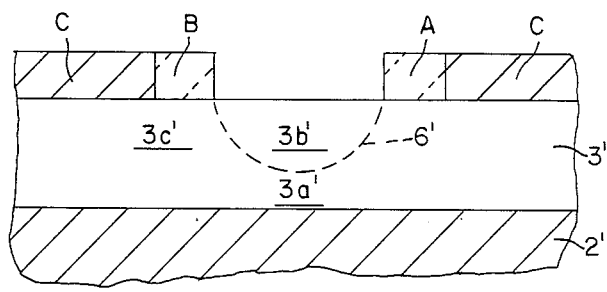
FIG. 6 is a view similar to FIGS. 3-5, but showing positions of the silicon dioxide etched away.

Referring now to FIG. 5, a thin film of silicon dioxide C is deposited over the structure shown in FIG. 4, i.e., over layer 3', narrow ribs or ridges A and B and core zone 3b'. The portion of the thin film of silicon dioxide C not covering narrow ridges A and B and core zone 3b' are then masked and the unmasked silicon dioxide is etched away with $C_2F_4$, $CCl_2F$ or $SF_6$ over narrow ridges A and B and the core zone 3b', leaving the structure shown in FIG. 6. In FIG. 6, the silicon dioxide layer C extends laterally away from the narrow ribs or ridges A and B, leaving the core zone 3b' and narrow ridges A and B exposed.

Figure 7:
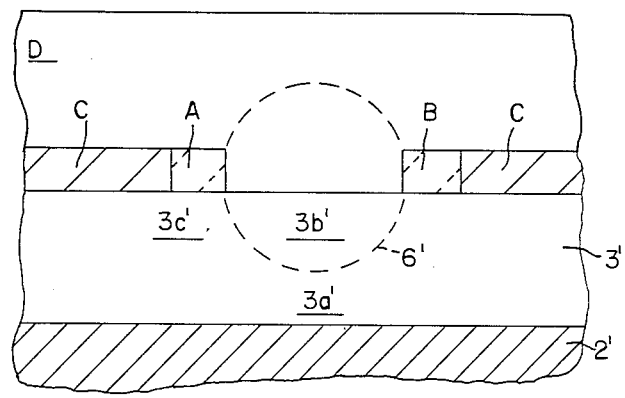
FIG. 7 is a view similar to FIGS. 3-6, but showing deposition of subsequent covering films of silicon dioxide doped with fluorine which complete the core zone and form a sheathing zone.

In a final step, a layer system D comprised of a plurality of layers is applied over the structure shown in FIG. 6 whereby the refractive index course of the layer system is selected so that the core zone 3b' is complemented. The area D is formed of layers of silicon dioxide doped with fluorine and completely covers the structure shown in FIG. 6 so as to produce the structure shown in FIG. 7. In this way, a planar monomode light wave guide is formed which is able to transmit light with a defined polarization direction. The said planar monomode light wave guide is also able to polarize the monomode light propagating in two orthogenal modes. Those half part of the light the plane of polarization of which is parallel to the substrate can leave the core zone by "tunnelling" through the two narrow strips A and B into the $SiO_2$ layer C. The other half part of the light the plane of polarization of which is perpendicular to the substrate, and the said plane of polarization itself, remain due to stress birefringence caused by the narrow rips A and B.

With respect to practicing both the first embodiment (FIGS. 1 and 2) and the second embodiment (FIGS. 3–7) of the instant invention, the process for depositing the first layer 3 and 3' is already known, for example from EP-0017296, and is here understood to be a process which operates with a so-called "cold" plasma in which only electrons have a high kinetic energy. With such a plasma, even gas mixtures which are not thermally reactive can be caused to react. With this non-isothermic PCVD process, it is possible at fairly low temperatures to precipitate glass-like layers directly out of a material in a gaseous phase, so that subsequent heat application for vitrification may be dispensed with. A further advantage of this approach resides in that for ar precipitation at low temperatures, that is to say temperatures between room temperature and about 300° C., any potentially existing difference in the thermal expansion coefficients of the glass plate material and the layers deposited thereon will not have a noticeable adverse effect.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of making a planar lightwave guide wherein the lightwave guide has at least one core zone with light conduction therein, the method comprising the steps of:

depositing an initial sheathing layer of glassy material on a substrate by precipitating the material directly out of a cold plasma and directly onto the substrate in thin glassy strata by using a heterogeneous reaction, the material being doped with a doping medium which decreases the refractive index when applied to the substrate;

applying a masking layer over first regions of the initial sheating layer to act as a diffusion barrier with respect to the doping medium while second unmasked regions of the initial sheathing layer remain uncovered by the masking layer;

heating the substrate with the initial sheathing layer thereon to diffuse the doping medium out of the unmasked regions of the initial sheathing layer in portions adjacent to the surface of the initial sheathing layer thereby to form core zone regions; and depositing subsequent covering layers of glassy strata doped with a doping medium over the masking layer and over the core zone regions to isolate the core zone regions from the remainder of the lightwave guide.

2. The method according to claim 1 in that the deposition by precipitation of the glassy strata is obtained by application of a non-isothermic plasma CVD process.

3. The method according to claim 1 in that after diffusing out of the doping medium, a thin layer of the unmasked regions and of the masking layer is removed by etching.

4. The method according to claim 1 in that the covering and masking layer is applied as a boron-doped layer.

5. The method according to claim 1, in that fluorine is used as the doping medium.

6. The method according to claim 1 in that the refractive index profile, the numerical aperture and the dimensions of the core zone regions are shaped to form a monomode wave-guide with predetermined properties.

7. The method according 5 claim 1 in that the refractive index profile, the numerical aperture and the dimensions of the core zone regions are shaped as to form a multimode wave-guide with predetermined properties.

8. The method according to claim 1 in that the initial sheathing layer provided with a refractive-index-decreasing doping medium is applied to the substrate in a thickness such that after diffusing out of the doping medium, a sufficiently large doped region is preserved between the core zone regions thus formed and the substrate to ensure that wave energy is completely isolated from the substrate.

9. The method according to claim 1 in that portions of the masking layer directly adjacent the core zones are retained while portions of the masking layer not directly adjacent the core zones and delated so as to form ribs of masking material extending laterally of the core zone regions.

10. The method according to claim 9 in that a layer of silicon dioxide is deposited on the initial sheathing adjacent to the ribs where portions of the masking layer have been deleted.

11. The method according to claim 10 in that the covering layers include a silicon dioxide layer doped with fluorine.

* * * * *